United States Patent [19]
Horning

[11] 3,887,397

[45] June 3, 1975

[54] HIGHLY CONDUCTIVE STABLE ELECTROLYTE FOR LITHIUM BATTERIES

[75] Inventor: Robert J. Horning, Sellersville, Pa.

[73] Assignee: Honeywell Inc., Minneapolis, Minn.

[22] Filed: Jan. 2, 1974

[21] Appl. No.: 430,027

[52] U.S. Cl. ............ 136/6 LN; 136/100 R; 136/155
[51] Int. Cl. .................... H01m 17/02; H01m 43/06
[58] Field of Search ......... 136/6 LN, 155, 154, 137, 136/100 R, 83 R, 20

[56] References Cited
UNITED STATES PATENTS

| | | | |
|---|---|---|---|
| 3,393,092 | 7/1968 | Shaw et al. ........................ | 136/6 LN |
| 3,415,687 | 12/1968 | Methlie ............................ | 136/100 R |
| 3,547,703 | 12/1970 | Blomgren et al. .................. | 136/154 |
| 3,553,031 | 1/1971 | Byrne et al. ...................... | 136/155 X |
| 3,579,384 | 5/1971 | Abens ............................. | 136/100 R |

Primary Examiner—Anthony Skapars
Attorney, Agent, or Firm—Charles J. Ungemach; Albin Medved; John S. Munday

[57] ABSTRACT

The use of $LiBF_4$ to stabilize high energy Lithium batteries having an electrolyte of methyl formate and $LiAsF_6$.

3 Claims, No Drawings

HIGHLY CONDUCTIVE STABLE ELECTROLYTE FOR LITHIUM BATTERIES

BACKGROUND OF THE INVENTION

It has been known for some time that batteries which employ Lithium as an anode, methyl formate as the electrolyte solvent and $LiAsF_6$ as the electrolyte salt, and a cathode are not stable and are particularly not stable at high temperatures. The problem is two fold, in that there is a short discharge life after storage due to apparent chemical changes in the electrolyte and there is a pressure build up with respect to time because of detrimental side reactions in the electrolyte.

Yet, these same unstable electrolyte systems for Lithium batteries produce extremely high energy due to the high conductivity of the salts in the solvent. There are many applications where batteries are constructed of a shape which requires high conductivity to permit efficient and economical utilization of the chemicals. Design limitations do not permit utilization of less conductive electrolytes, yet conditions of use do not permit use of electrolytes which are incapable of long term storage.

Small batteries which are used in photographic products, watches and the like are constructed in a manner to require high conductivity of the electrolyte, to permit utilization of the entire electrodes. Stated another way, the electrolyte must be conductive to permit the current producing reaction to take place when the anode and cathode are remotely positioned from one another due to space limitations. At the same time, it is necessary that these electrolyte solutions be stable to prevent destructive pressure build up.

OBJECTS OF THE INVENTION

It is, therefore, the object of this invention to provide a method for stabilizing Lithium non-aqueous batteries.

A more particular object of this invention is to provide a method for stabilizing highly conductive methyl formate-$LiAsF_6$ electrolytes for use with Lithium batteries.

Other objects will appear hereinafter.

THE INVENTION

It has now been discovered that batteries which contain a Lithium anode, an electrolyte of methyl formate having $LiAsF_6$ dissolved therein and a cathode inert to the electrolyte may be significantly improved in terms of stability by the addition of a minor portion of $LiBF_4$.

The amount of $LiBF_4$ which should be employed may vary depending upon the stability desired. Normally, the minor amount of $LiBF_4$ will range from approximately 0.05 molar to as much as 0.8 molar in the methyl formate. A more preferred range is from about 0.2 to about 0.6 molar.

As mentioned above, these batteries employ a Lithium anode, the cathode is any cathodic material which is inert to the electrolyte. Among these are $V_2O_5$, $Ag_2CrO_4$, $MoO_3$, $CF$, $MnO_2$, $CF_2$, $CS$ and the like. As stated above, this invention relates to a stabilizing of the electrolyte and does not require any particular cathode for its use. All that is necessary is that the cathode be inert to the electrolyte in the normal manner of Lithium batteries.

To demonstrate the practicality of the present invention, a number of experiments were run. In one instance, the conductivity of various materials were measured, since conductivity is an important aspect of Lithium batteries. The conductivity of a 2 molar solution of $LiAsF_6$ in methyl formate is approximately 45 millimhos/cm. $LiBF_4$, on the other hand, as a 2 molar solution in methyl formate has a conductivity of only about 18. A mixture employing the concepts of the present invention, in which a 2 molar solution of $LiAsF_6$ solution in methyl formate included the addition of 0.4 molar quantity of $LiBF_4$ had a conductivity of 40.

Tests were made of a number of samples to determine the stability of these materials. 25 units were constructed using $LiAsF_6$ in methyl formate with this electrolyte filled into glass ampules and sealed. These ampules exploded before the end of a six month period, due to excessive pressure built up in the ampules through chemical change and detrimental side reactions. A similar quantity of ampules were filled with $LiAsF_6$ dissolved in methyl formate with the addition of a sufficient quantity of $LiBF_4$ to make a 0.4 molar solution. None of these ampules were damaged by instability of the electrolyte after the same six month period of storage at the identical temperature. Cells fabricated with the stored ampules containing the $LiBF_4$ were then tested and there was no change indicated in electrical current producing capabilities. It should be noted that ampules containing methyl formate and $LiBF_4$ without any $LiAsF_6$ also were capable of storage for the same period of time at the same temperature.

The previously mentioned ampules which had been stored for six months at elevated temperature were then incorporated into cells which had a Lithium anode and a $V_2O_5$ cathode. Those cells which had $LiBF_4$ dissolved in methyl formate discharged in less than 230 hours at low current drain. Cells utilizing the combination of 2.0 molar $LiAsF_6$ and 0.4 molar $LiBF_4$ in methyl formate discharged for 781 hours at the identical low current rate. It was, of course, impossible to evaluate the electrolytes consisting of $LiAsF_6$ and methyl formate since those ampules had exploded.

Thus it can be seen that the present invention significantly improves the storage capability or stability itself of Lithium batteries which employ the highly conductive $LiAsF_6$-methyl formate electrolyte.

Having thus described the invention, what is claimed is:

1. In a current producing cell having a Lithium anode, an electrolyte of methyl formate having $LiAsF_6$ dissolved therein and a cathode inert to said electrolyte, the improvement comprising:
   a minor portion of $LiBF_4$ dissolved in said methyl formate.

2. The cell of claim 1 wherein the amount of $LiBF_4$ ranges from 0.05 molar to 0.8 molar.

3. The cell of claim 1 wherein the amount of $LiBF_4$ ranges from 0.2 molar to 0.6 molar.

* * * * *